(12) United States Patent
Anderson

(10) Patent No.: US 11,975,240 B2
(45) Date of Patent: May 7, 2024

(54) LINE ASCENDER

(71) Applicant: Chris Anderson, Nimbin (AU)

(72) Inventor: Chris Anderson, Nimbin (AU)

(*) Notice: Subject to any disclaimer, the term of this patent is extended or adjusted under 35 U.S.C. 154(b) by 1047 days.

(21) Appl. No.: 16/472,840

(22) PCT Filed: Dec. 19, 2017

(86) PCT No.: PCT/AU2017/051411
§ 371 (c)(1),
(2) Date: Jun. 21, 2019

(87) PCT Pub. No.: WO2018/112518
PCT Pub. Date: Jun. 28, 2018

(65) Prior Publication Data
US 2019/0329098 A1 Oct. 31, 2019

(30) Foreign Application Priority Data

Dec. 23, 2016 (AU) ............................... 2016905373

(51) Int. Cl.
| | |
|---|---|
| A63B 29/02 | (2006.01) |
| A62B 1/14 | (2006.01) |
| A62B 1/20 | (2006.01) |
| F16D 63/00 | (2006.01) |
| F16D 121/14 | (2012.01) |
| F16D 125/28 | (2012.01) |

(52) U.S. Cl.
CPC ............... *A63B 29/02* (2013.01); *A62B 1/14* (2013.01); *A62B 1/20* (2013.01); *F16D 63/008* (2013.01); *F16D 2121/14* (2013.01); *F16D 2125/28* (2013.01)

(58) Field of Classification Search
CPC .......... F16D 63/008; A62B 1/14; A62B 1/20; A62B 35/0081; A63B 29/02
See application file for complete search history.

(56) References Cited

U.S. PATENT DOCUMENTS

| | | | | |
|---|---|---|---|---|
| 1,505,360 | A | | 8/1924 | Lowery |
| 3,265,032 | A | * | 8/1966 | Hume ..................... B63B 21/08 |
| | | | | 114/99 |
| 3,730,129 | A | | 5/1973 | Helms |
| 4,092,941 | A | * | 6/1978 | Gryglas ................... B63H 9/10 |
| | | | | 114/218 |
| 4,397,253 | A | * | 8/1983 | Uecker ................. F16G 11/106 |
| | | | | D8/382 |

(Continued)

FOREIGN PATENT DOCUMENTS

| | | |
|---|---|---|
| CH | 1111139 A | 7/1925 |
| CN | 105533923 A | 5/2016 |
| FR | 2972936 | 3/2011 |

OTHER PUBLICATIONS

Extended European search report (17883948.6-PCT/AU2017051411) dated Jul. 9, 2020.

*Primary Examiner* — Nicholas J Lane
(74) *Attorney, Agent, or Firm* — SIERRA IP LAW, P.C.; Mark D. Miller

(57) ABSTRACT

A line ascender for enabling a person to ascend a line including a receiver which tapers laterally to the line to receive the line laterally and a clamp provided for clamping the received line responsive to weight of the person. Advantageously, an errant rope can be readily received within the tapered receiver for re-engagement by the clamp.

11 Claims, 4 Drawing Sheets

(56) References Cited

U.S. PATENT DOCUMENTS

| | | | |
|---|---|---|---|
| 6,286,625 B1 * | 9/2001 | AstvasaDoorian | A63B 27/02 182/221 |
| 2009/0188753 A1 | 7/2009 | Liang | |
| 2018/0104544 A1 * | 4/2018 | Lob | A63B 29/02 |

* cited by examiner

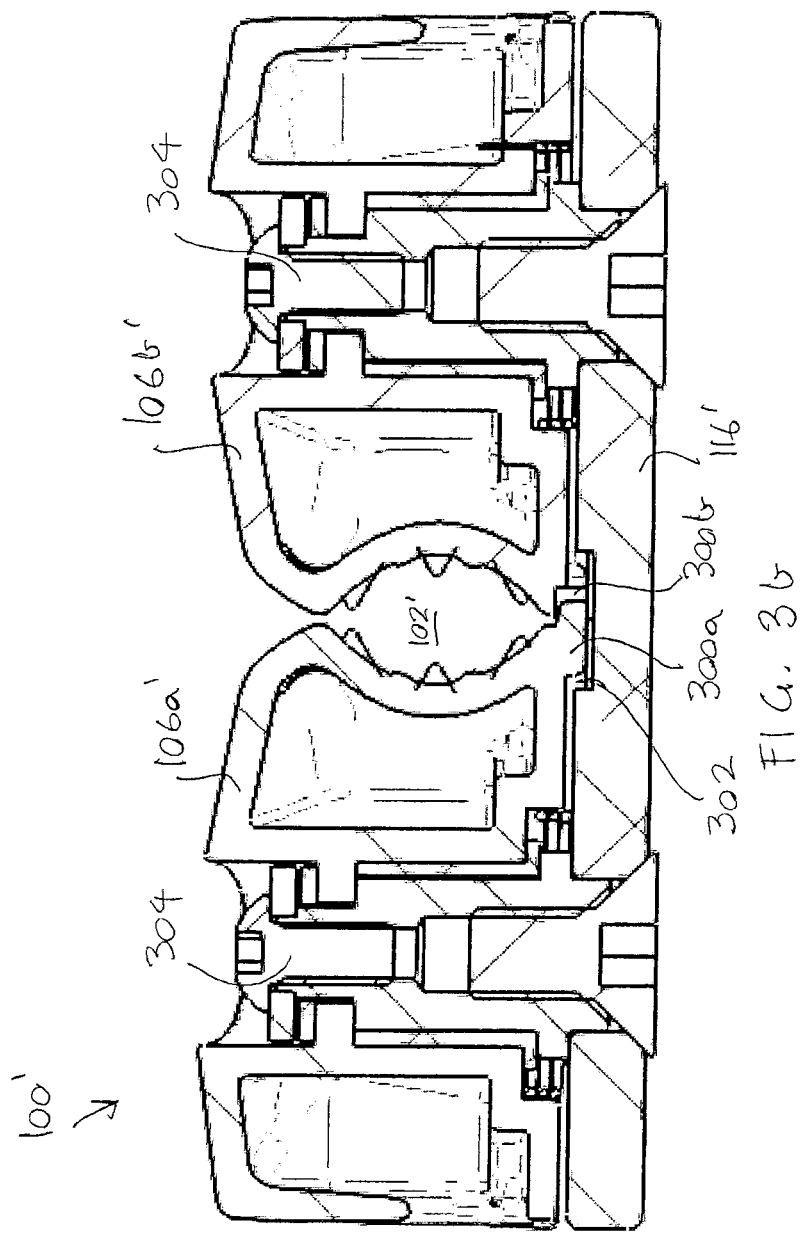

LINE ASCENDER

TECHNICAL FIELD

The present invention generally relates to a line ascender typically for enabling a person to ascend a line. The present invention has particular, although not exclusive application to enabling an arborist to climb a rope hanging from a tree.

BACKGROUND

The reference to any prior art in this specification is not, and should not be taken as an acknowledgement or any form of suggestion that the prior art forms part of the common general knowledge.

An arborist is a professional in the practice of arboriculture, which includes the cultivation, management, and study of individual trees. Arborists generally focus on the health and safety of individual trees and are often required to climb them when undertaking their duties. In practice the climbing of trees with ropes is an arduous task.

U.S. Pat. No. 6,282,625 discloses a rope climbing device for assisting with ascending or descending along a rope. The rope climbing device includes a complex actuating mechanism connecting downwardly tapering cams to a slide member. An actuating spring moves the cams from an open position to a gripping position as the slide member moves as the result of downward force on a base member. Owing to its complexity, the actuating mechanism is expensive to manufacture and prone to breakdown.

Advantageously, the preferred embodiment provides a line ascender with a less complex actuating mechanism that is less expensive to manufacture and less prone to breakdown.

To ascend the rope using the device of U.S. Pat. No. 6,282,625, the person moves their feet up and down like ascending stairs. In practice, the rope would ideally stay within a housing during ascension. It is difficult to reintroduce the errant rope within the housing during climbing, particularly as the size of the rope increases.

Advantageously, the preferred embodiment facilitates reconnection with an errant rope.

SUMMARY OF THE INVENTION

According to one aspect of the present invention, there is provided a line ascender for enabling a person to ascend a line, the line ascender including:
a receiver which tapers laterally to the line to receive the line laterally; and
a clamp for clamping the received line responsive to weight of the person.

Advantageously, an errant rope can be readily received within the tapered receiver for re-engagement by the clamp.

The clamp may include one or more cams. The clamp may include a pair of rotational cams which directly engage with the line and are moved together by the line without the need for a separate actuator. The cams may be normally biased open. Each cam may further taper downwardly, in use, so that greater weight causes increased clamping as the clamped line forces free ends of the cams together. The cams may have free ends that pinch the line, in use. The cams may form a downwardly facing recess prior to clamping the line. The cams may independently rotate. Alternatively, the cams may include a connecting mechanism (e.g. interlocking teeth) so that the cams move together. Preferably, the cams move from an open configuration when receiving the line laterally to an encapsulating configuration when encapsulating and clamping the line. Accordingly, the person may disengage from the line, mid-climb and without using their hands, to perform some tasks and then re-engage with the line to continue climbing.

The clamp may further include a gripper for gripping the line. The gripper may include teeth for gripping the line. The ascender may include a mechanical restraint or stop for restraining or stopping rotation of the cams. The teeth may be angled so that the line is gripped when moving through the clamp in one direction only.

The receiver may include biasing means to bias the clamp open. The biasing means may include torsional springs located within respective cams.

The receiver may taper in a generally concave manner to facilitate engagement with a round line. The receiver may be configured to draw in the received line during clamping.

The ascender may further include a body to which the clamp is fastened. The body may include a plate. The cams are movable on the plate to accommodate lines of different diameters. The plate may include slots for accommodating a fastening strap passing around the person. The strap may pass around the person's leg or arm. The person may move the leg or arm inwardly and downwardly to actuate the clamp.

Preferably, the line is a rope. Alternatively, the line may be a cable, wire, strap etc.

According to another aspect of the present invention, there is provided a line ascender for enabling a person to ascend a line, the line ascender including a clamp for clamping the line responsive to weight of the person, the clamp including a pair of rotational cams which directly engage with the line and are moved together by the line.

Advantageously, the cams themselves are moved together by the line without the need for a separate actuator thereby decreasing manufacturing costs and reducing the likelihood of breakdown.

According to another aspect of the present invention, there is provided a line ascender for enabling a thing to ascend a line, the line ascender including:
a receiver which tapers laterally to the line to receive the line laterally;
a clamp for clamping the received line responsive to directional force applied by the thing.

The thing may be a person, or a robot or machine.

According to another aspect of the present invention, there is provided a line ascender including:
cams for clamping a line responsive applied pressure and releasing the line when pressure is released, without any other mechanism other than the cams themselves to actuate clamping and releasing.

According to another aspect of the present invention, there is provided a line ascender including a clamp configured to draw in and clamp a received line.

According to another aspect of the present invention, there is provided a line gripper including:
a receiver which tapers laterally to a line to receive the line laterally;
a clamp for clamping the received line responsive to loading of the line.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 2a is an end view of the line ascender of FIG. 1a;

FIG. 2a is a perspective view of the line ascender of FIG. 1 in a line gripping position;

FIG. 2b is an end view of the line ascender of FIG. 2a;

FIG. 3b is an end sectional view of the line ascender of FIG. 3a.

DETAILED DESCRIPTION OF PREFERRED EMBODIMENTS

Figure 1A:
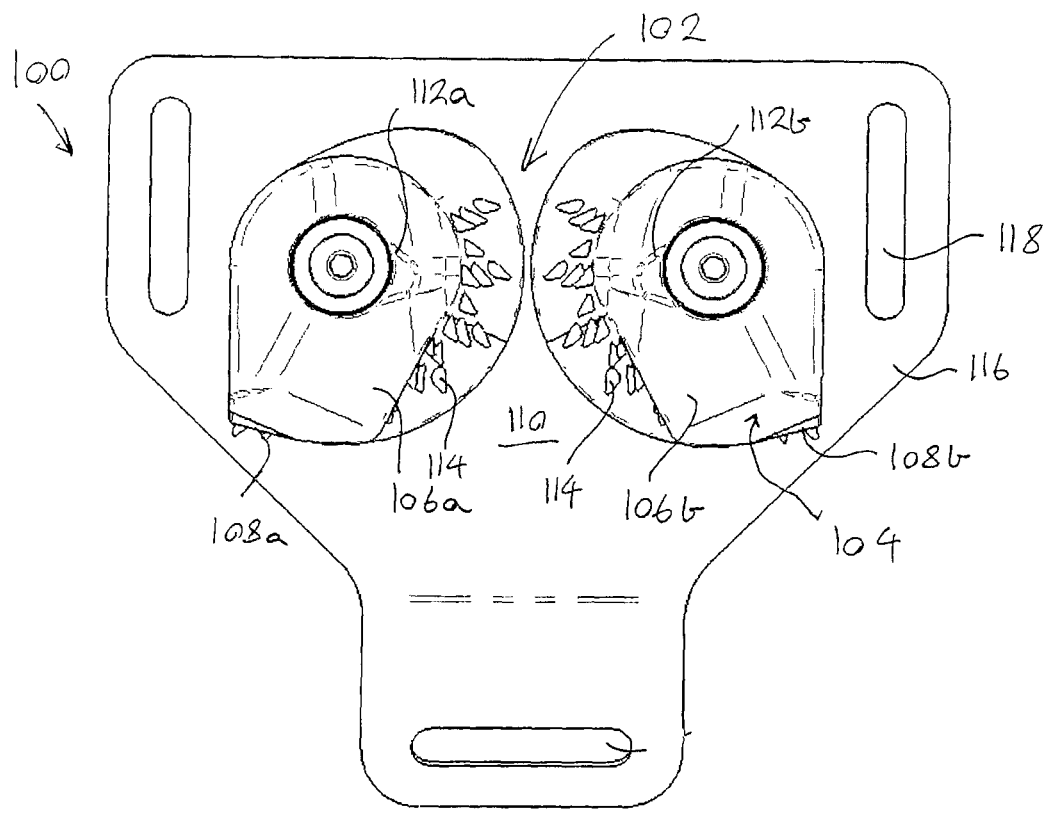
FIG. 1a is a side view of a line ascender in an open position at rest and in accordance with an embodiment of the present invention.
Figure 1B:
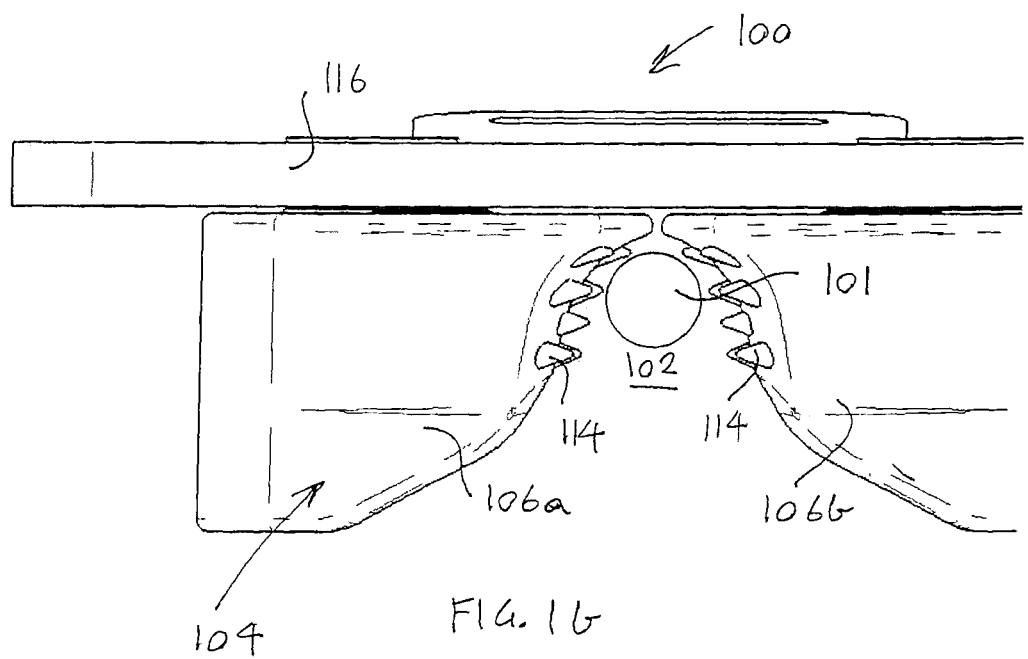
Figure 2A:
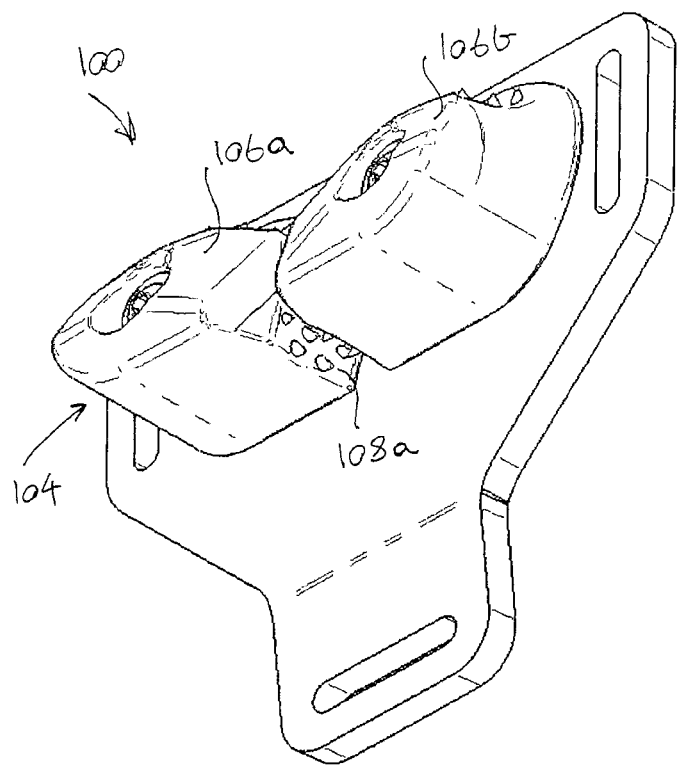
Figure 2B:
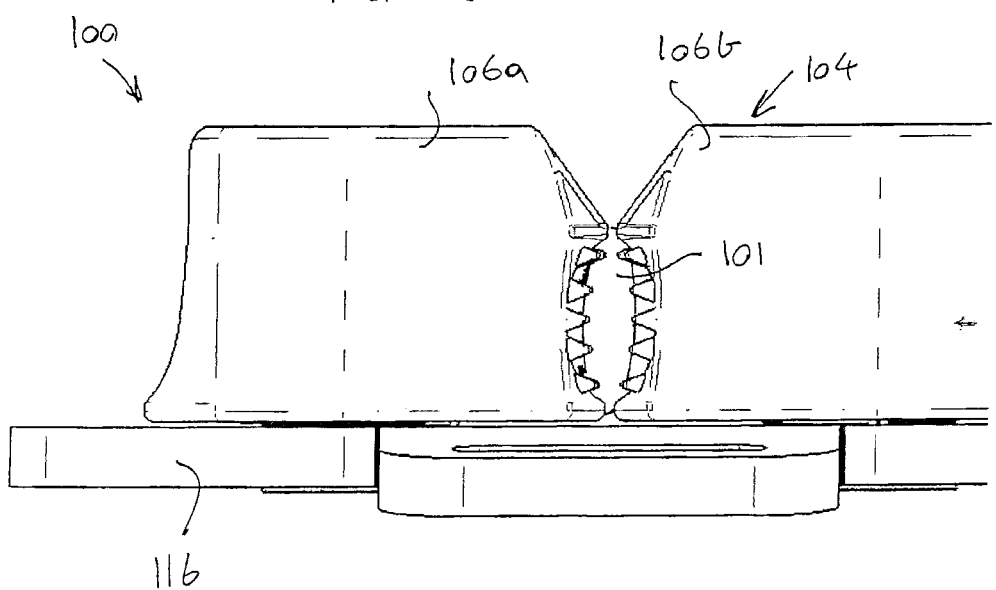

According to an embodiment of the present invention, there is provided a line ascender 100 for enabling a person to ascend a line (e.g. rope) 101 as shown in FIG. 1. The line ascender 100 includes a receiver 102 which tapers laterally to the vertical line 101 to receive the line 101 laterally as shown in FIG. 1b. A clamp 104 is provided for clamping the received line 101 under weight of the person wearing the ascender 100 as shown in FIG. 2. Advantageously, an errant rope 101 is readily received within the tapered receiver 102 for re-engagement by the clamp 104.

Returning to FIG. 1, the clamp 104 includes a pair of rotational cams 106a, 106b which directly grip the line and are moved together by the gripped line 101. Advantageously, the cams 106a, 106b themselves are moved together by the line 101 without the need for a separate actuator thereby minimising manufacturing costs and the likelihood of breakdown.

As shown in FIG. 1a, the cams 106a, 106b are normally biased wide open. Each cam 106a, 106b further tapers downwardly, in use, so that greater weight causes increased clamping as the clamped line forces free ends 108a, 108b of the cams 106a, 106b together. The free ends 108a, 108b pinch the line 101, in use. The cams 106 form a downwardly facing recess 110 prior to clamping the line 101. When viewed from above, the cams 106a, 106b move from an open configuration shown in FIG. 1b receiving the rope 101 to an encapsulating configuration shown in FIG. 2b encapsulating and gripping the rope 101. The encapsulated rope 101 cannot accidently disengage when bearing weight.

The receiver 102 includes biasing means to bias the clamp 104 open so that the cams 106a, 106b automatically spring open when the person's weight is removed. The biasing means include torsional springs 112a, 112b located within respective cams 106a, 106b. The ascender 100 includes a mechanical restraint (e.g. pin in groove) or stop for restraining or stopping rotation of the cams 106a, 106b between the open position of FIG. 1 and the gripping position of FIG. 2. The cams 106a, 106b are restrained to independently rotate between these positions only. The clamp 104 further includes a gripper, including surface teeth 114, for gripping the line 101. The teeth 114 are angled so that the rope 101 is gripped when moving through the clamp 104 in one direction only (being the upward direction in which the person wishes to ascend) thereby enabling fluid movement of the person. The teeth 114 do not damage the rope 101.

As can best be seen in FIG. 1b, the receiver 102 tapers in a generally concave manner to facilitate engagement with the round line 101. Each cam 106 has curves in the vertical and transverse plane which are configured to draw in and clamp the rope 101 when the rope is either not centered between the cams 106a, 106b or only shallowly inserted between the cams 106a, 106b.

The ascender 100 further includes a plate body 116 to which the clamp 104 is fastened. The cams 106a, 106b are movable on the plate body 116 to accommodate ropes of different diameters. The body 116 includes slots 118 for accommodating a fastening strap passing around the person. The strap passes around the person's ankle or foot of the leg or wrist of the arm. The person moves the leg or arm inwardly and downwardly to actuate the clamp 104 on the static line 101 into the line gripping position shown in FIG. 2.

A method for ascending the line 101 using a pair of ascenders 100 is now briefly described.

Initially, each body 116 is fastened around a respective ankle using straps.

The person moves a leg inwardly and downwardly relative to the static vertical line 101. The line 101 is received by the receiver 102 and the teeth 114 grip the static line 101 to rotate the cams 106a, 106b. As the ascender 100 moves downward, the line 101 pulls the free ends 108a, 108b together to pinch and clamp the line 101 (FIG. 2). Accordingly, the cams 106a, 106b move from being flared outwards when receiving the rope 10 to encasing the rope 101.

The person can then extend the coupled leg to ascend the line 101 and engage the other leg higher up the line 101. Once that other leg is engaged higher in the same manner, the lower leg can be lifted to disengage the lower ascender 100 from the line 101 as the cams 106a, 106b rotate open again with the removal of weight, and is then engaged higher up again.

The ascenders 100 enable the person to use a walking motion, moving one foot past the other, to scale the line 101 in a very speed manner that is quick to learn. The person can descend the line 101 in a reverse manner. Advantageously, the person can freely disengage from the line 101, mid-climb and without using their hands, to perform some tasks and then re-engage with the line 101 to continue climbing.

A person skilled in the art will appreciate that many embodiments and variations can be made without departing from the ambit of the present invention.

Figure 3A:
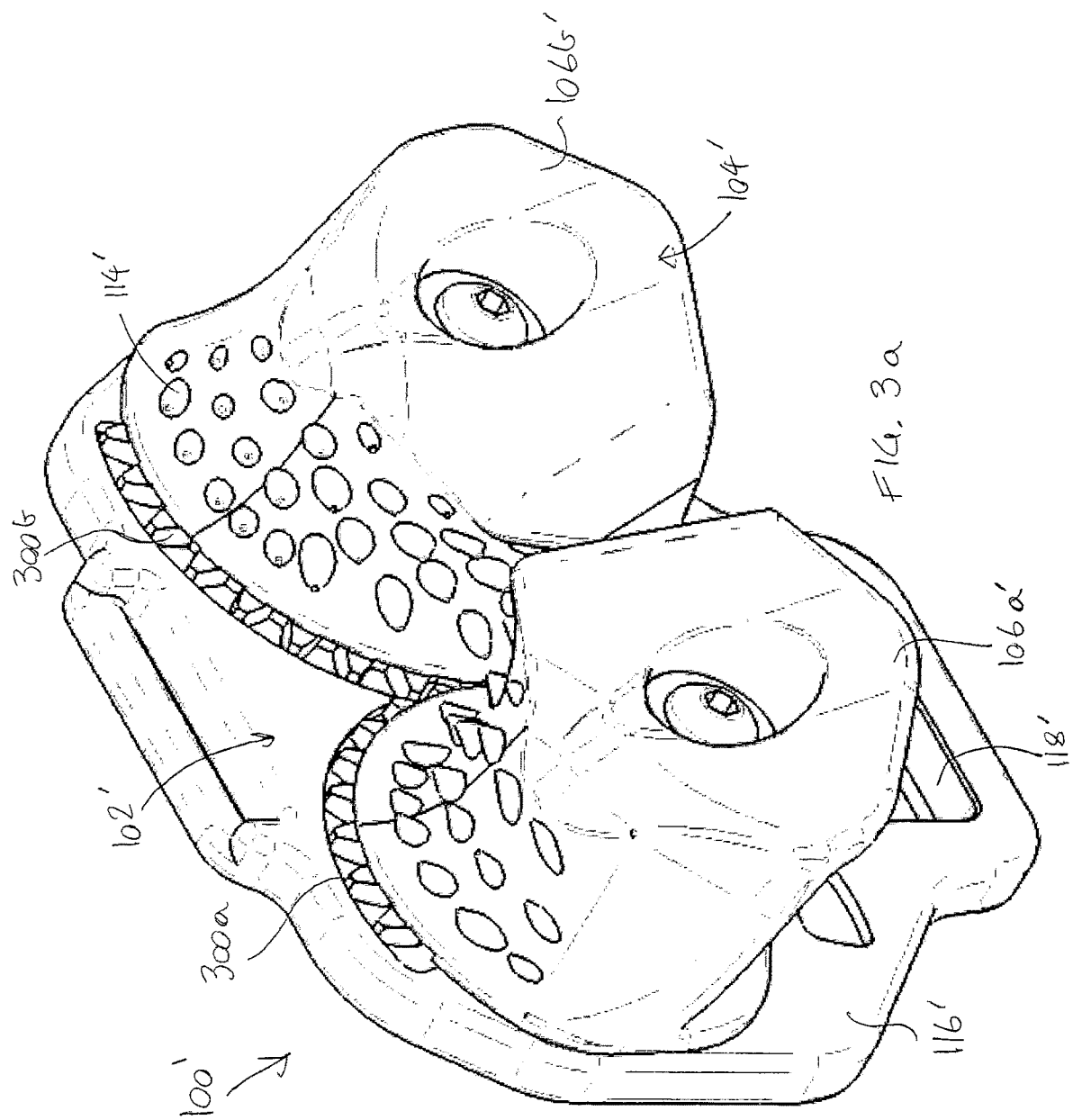
FIG. 3a is a perspective view of a line ascender in a line gripping position and in accordance with an embodiment of the present invention.

In another embodiment shown in FIG. 3 where like reference numerals refer to like features previously described, the cams 106a', 106b' include interlocking gear teeth 300a, 300b so that the cams 106a', 106b' move together in unison to avoid misalignment of the cams 108a', 108b'. That is, movement of one cam 108a' imparts movement of the other cam 108b'. As can best be seen in FIG. 3b, the plate body 116' defines a recess 302 in which the gear teeth 300a', 300b' rotate.

The cams 106a', 106b' are rotationally fastened to the plate body 116' using fasteners 304, each including two parts that thread together from wither side of the plate body 116'.

The present invention may be used for yachting. The ascender 100 can be used for climbing and rigging purposes similar to ascending a line for tree work. In an alternative use, it could be used in place of a cleat on a yacht whereby the device 100 is fixed to a point on the yacht. A line 101 can be placed between the cams 108a, 108b which, in turn, will automatically grip the line 101 as a load on the line takes up. When the load is removed, the cams 108a, 108b will automatically release the line.

The present invention may also be used for rescue, rope access, mountaineering, caving, rock climbing, areal rescue, rigging, scaling machines and robots, etc. the present invention is not limited for these purposes.

The tension of the cam springs can be varied and calibrated to the specific use and/or the specific user. For example, when used for climbing, the cams can be open as soon as the climber transfers their weight to the other foot as this 'frees' the unweighted foot time for a smooth transition. In other applications (e.g. sailing) the spring can release when there is some pressure on the rope, but not as much as when gripping to climb.

In one embodiment, the line ascender may form part of footwear, gloves, wrist attachments, ankle attachments etc. In another embodiment, the line ascender may be fastened to a machine part. The line ascender may be provided with attachment straps, protective clothing, wrist straps mounting shackles, etc.

The line may be a cable, wire, strap etc.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The claims defining the invention are as follows:

1. A line ascender for enabling a person to ascend a line, the line ascender comprising:
   a plate body configured to be fastened about a leg or arm of the person;
   a pair of rotational cams rotationally mounted to the plate body and defining a clamp for clamping the line under weight of the person wearing the line ascender, said cams being independently rotatable relative to the plate body between an open configuration in which a receiver is defined between the cams and the plate body for laterally receiving the line therein and an encapsulating configuration for encapsulating and clamping the line received therein,
   wherein each of the pair of rotational cams has a plurality of discrete, protruding surface teeth discretely arranged across and along a clamping surface of the cam for gripping the line when in the open configuration, and, responsive to the weight of the person so as to cause the cams to move together to the encapsulating configuration without the need for a separate actuator, each of said surface teeth having a base and an opposed pointed tip angled downwards so that the line is gripped when moving upwards through the clamp in one axial direction only,
   wherein each of the pair of rotational cams has curves in a vertical and transverse plane such that the receiver tapers laterally to the line to facilitate engagement with the line and draw in and clamp the line when not centred or only shallowly received in the receiver, and
   wherein the cams are normally biased open, each said cam including a torsional spring to bias the cams away from each other such that responsive to the weight of the person being removed, the cams automatically return to the open configuration.

2. The line ascender as claimed in claim 1, wherein an errant rope can be readily received within the receiver for re-engagement by the clamp.

3. The line ascender as claimed in claim 1, wherein each cam tapers downwardly, in use, so that greater said weight causes increased clamping as the clamped line forces free ends of the cams together.

4. The line ascender as claimed in claim 1, wherein the cams have free ends that pinch the line, in use.

5. The line ascender as claimed in claim 1, wherein the cams form a downwardly facing recess prior to clamping the line.

6. The line ascender as claimed in claim 1, wherein the person can disengage from the line, mid-climb and without using their hands, to perform some tasks and then re-engage with the line to continue climbing.

7. The line ascender as claimed in claim 1 comprising a mechanical restraint or stop for restraining or stopping rotation of the cams.

8. The line ascender as claimed in claim 1, wherein the discrete protruding surface teeth are angled downwards so that the line is gripped when moving upwards through the clamp in one axial direction only.

9. The line ascender as claimed in claim 1, wherein the receiver is configured to draw in the received line during clamping.

10. The line ascender as claimed in claim 1, wherein said cams are movable on the plate to accommodate lines of different diameters.

11. The line ascender as claimed in claim 1, wherein the plate body comprises slots for accommodating a fastening strap passing around the person, wherein the strap passes around the person's leg or arm and the person can move the leg or arm inwardly and downwardly to actuate the clamp.

* * * * *